United States Patent [19]

Disselbeck et al.

[11] 4,405,460

[45] Sep. 20, 1983

[54] PROCESS AND DEVICE FOR SEPARATING MIXTURES OF MATTER IN THE LIQUID PHASE

[75] Inventors: Dieter Disselbeck, Bad Soden am Taunus; Klaus Speier, Kelkheim, both of Fed. Rep. of Germany

[73] Assignee: Hoechst Aktiengesellschaft, Frankfurt am Main, Fed. Rep. of Germany

[21] Appl. No.: 265,343

[22] Filed: May 19, 1981

[30] Foreign Application Priority Data

May 21, 1980 [DE] Fed. Rep. of Germany ....... 3019355

[51] Int. Cl.³ .......................................... B01D 31/00
[52] U.S. Cl. ..................................... 210/640; 202/236
[58] Field of Search ................ 202/236, 234; 210/640; 159/13 R, 15; 203/DIG. 1

[56] References Cited

U.S. PATENT DOCUMENTS

| | | | |
|---|---|---|---|
| 3,415,719 | 12/1968 | Telkes | 202/236 X |
| 3,563,860 | 2/1971 | Henddfryckx | 202/236 X |
| 3,788,954 | 1/1974 | Cantrell | 159/13 X |
| 4,233,153 | 11/1980 | Hammel et al. | 159/13 R X |

*Primary Examiner*—Frank A. Spear, Jr.
*Attorney, Agent, or Firm*—Curtis, Morris & Safford

[57] ABSTRACT

In a process for separating mixtures of matter in the liquid phase and a device suitable therefor, liquid (12) absorbs heat during its passage through a first cavity (3), said heat having been generated during the condensation yielding the condensate (13) at the upper wall portion (5) of the first cavity. The thus preheated liquid is passed to a third cavity (9), the upper wall portion (10) of which is liquid-tight and gas-tight and absorbs the thermal radiation (11). Part of the liquid further heated by said process evaporates and penetrates in vapor form through the liquid-tight, steam-permeable upper wall portion (8) of the third cavity (9) into a second cavity (6), the upper wall portion (8) of which is one and the same as the lower wall portion (9) of the third cavity. This steam condenses under the cooling action of the first cavity (3). The condensate (13) so formed is withdrawn from the second cavity. The cavities (1) and (3) are advantageously contained in double fabrics provided with adequate coatings and the two fabrics of which are spaced apart by means of spacers in the form of filaments.

5 Claims, 1 Drawing Figure

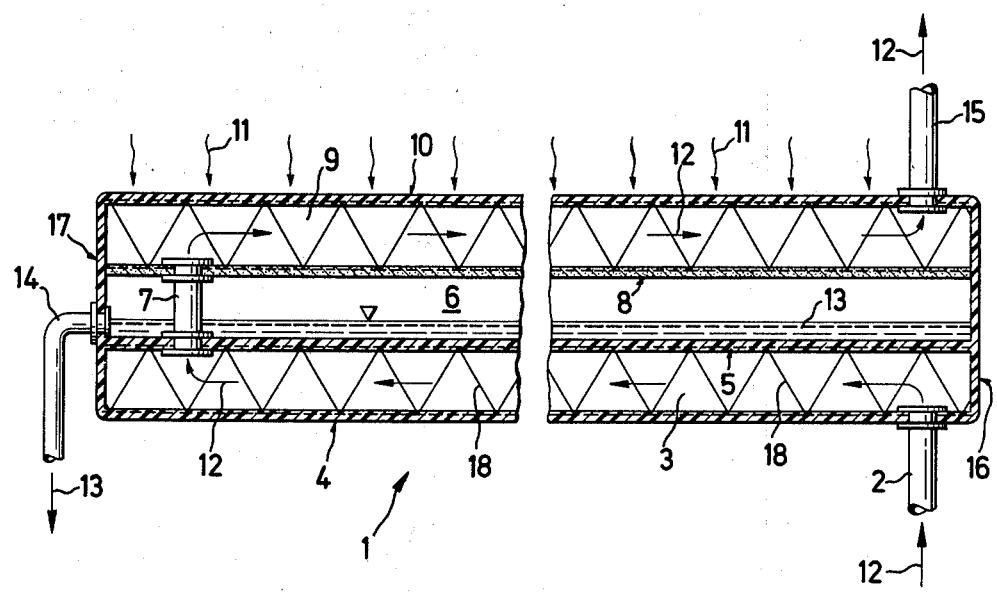

PROCESS AND DEVICE FOR SEPARATING MIXTURES OF MATTER IN THE LIQUID PHASE

The present invention relates to a process for separating mixtures of matter in the liquid phase by supplying heat to a hollow body through which liquids flow and which is provided with inlet and outlet means for the liquids, and to a device for carrying out this process.

The best known method for separating mixtures of matter in the liquid phase consists in submitting them to a distillation process, which involves heating the mixture of matter to the boiling point of one of the components contained therein while supplying heat energy to the system. Evaporation, however, requires a considerable amount of energy, which is generally obtained from fossil fuels. The utilization of alternative sources of energy is of increasing interest even for the separation of mixtures of matter, because of the progressing shortage of fossilized fuels and the rise in price involved therewith.

It is moreover known to use semi-permeable membranes, for example for the desalting of sea water, which membranes bar the passage of the salt (cf. German Offenlegungsschrift No. 2,910,413; Japanese Offenlegungsschriften Nos. 49,096,976; 53,090,367 and 53,095,83). Semi-permeable sheets made from polytetrafluoroethylene are moreover known and commercially available. Finally there have been described semi-permeable sheets laminated to textile structures (cf. Japanese Offenlegungsschrift No. 78,018,463).

These known processes and devices for separating mixtures of matter in the liquid phase, for example for desalting sea water, are not satisfactory in all respects, however, since they frequently involve technological difficulties and difficulties due to their construction.

It was therefore a task of the present invention to provide a simple process and a simple device permitting the separation of mixtures of matter in the liquid phase.

This task is fulfilled according to the invention by a process for separating mixtures of matter in the liquid phase by supplying heat to a hollow body through which liquids flow and which is provided with inlet and outlet means for the liquids, and a device for carrying out this process, this process comprising the following steps:

(1) A liquid is passed through an inlet into a first cavity,
  (a) the liquid-tight lower wall portion of which being formed by the lower wall portion of the hollow body and
  (b) the liquid-tight upper wall portion of which being simultaneously the lower wall portion of a second cavity,
  the liquid in said first cavity being heated by the condensation heat of the
(2) steam condensed in said cavity, which has penetrated into said cavity through
  (a) the liquid-tight, but steam-permeable upper wall portion of the second cavity,
(3) the liquid thus preheated is passed to the third cavity through a tube bridging the second cavity,
  (a) the liquid-tight upper wall portion of said third cavity being formed by the radiation-absorbing upper wall portion of the hollow body,
  (b) said upper wall portion being struck by thermal radiation, and
(4) part of the liquid heated by the upper wall portion penetrates in steam form into into said cavity through the liquid-tight, but steam-permeable upper wall portion of said cavity,
  (a) said steam being converted into a condensate in said cavity and
  (b) the condensate being subsequently withdrawn through outlet pipe while the liquid leaves said third cavity through the outlet pipe.

The device used according to the present invention preferably consists of a flat hollow body through which a liquid mixture of matter is passed, one wall portion of this hollow body consisting of a liquid-tight, radiation-absorbing layer and the second wall portion of this hollow body consisting of a liquid-tight, steam-permeable layer. The two opposed wall portions of this planar hollow body are preferably in the form of a double fabric the two portions whereof are connected with one another by means of spacers in the form of filaments.

The radiation-absorbing wall portion of the hollow body is preferably provided with a coat made of synthetic materials, that has been colored black, for example a coat made of polyvinyl chloride, rubber or polytetrafluoroethylene.

The wall portion opposed to the radiation-absorbing wall portion of the hollow body is provided with a liquid-tight, steam-permeable membrane, for example made of polytetrafluoroethylene.

A further preferred embodiment of the device according to the invention comprises a flat rigid hollow body, for example made from plastic or metal, one wall portion of which is liquid-tight and radiation-absorbing, while the opposed wall portion is liquid-tight and steam-permeable owing to its being perforated and coated with vapor-permeable material.

The present invention will be illustrated, by way of example, in the accompanying drawing representating a cross-sectional view of the device according to the invention, in the description referring to the drawing and in the description of the test procedure.

The numerals in the Figure have the following meanings: (1) designates the hollow body, (2) the inlet means, (3) the first cavity, (4) the lower wall portion of the hollow body and of the first cavity, (5) the lower wall portion of the second cavity, (6) the second cavity, (7) the bridging tube, (8) the upper wall portion of the second cavity, (9) the third cavity, (10) the upper wall portion of the hollow body and of the third cavity, (11) the thermal radiation, (12) the liquid, (13) the condensate, (14) the outlet pipe, from the second cavity (6) (15) the outlet pipe, from the third cavity (9) (16) and (17) exterior walls and (18) spacers in the form of filaments.

The liquid (12), which may by sea water, is passed through inlet pipe (2) into the first cavity (3) of the hollow body (1). The lower wall portion (4) of the hollow body (1), which is simultaneously the lower wall portion of the first cavity (3), is impermeable to the liquid (12), like the small wall portions (16) and (17) of the hollow body, the same applying to the lower wall portion (5) of the second cavity. This state of impermeability may be reached either by using adequate materials such as sheets, plastics or metals, which are tight to the liquid (12) owing to their structure or, when using for example fabrics, non-wovens or other textile structures, by coating or laminating these latter with plastics or sheets.

The liquid (12) in the first cavity (3) absorbs the heat generated during the formation of the condensate (13) in the second cavity (6). The thus-preheated liquid (12) is subsequently passed directly into the third cavity (9)

through tube (7). The lower wall portion of this third cavity (9) is formed by the upper wall portion (8) of the second cavity (6), said upper wall portion being semi-permeable to the liquid to be separated, that is, the steam of the liquid may penetrate through the upper wall portion (8) of the second cavity (6), but not the liquid itself. The liquid-tight, steam-permeable upper wall portion (8) of the second cavity (6) consists preferably of a non-woven fabric made of polytetrafluoroethylene.

These semi-permeable membranes are advantageously supported by a textile layer, for example, the upper wall portion (8) of the second cavity (6) and the upper wall portion (10) of the hollow body may be formed by the face side and the back side of a double fabric, which sides are spaced apart from one another by means of spacers (18) in the form of filaments.

The lower wall portion (4) of the hollow body (1) and the lower wall portion (5) of the second cavity (6), too, form preferably the two opposed wall portions of a double fabric spaced apart by means of spacers in the form of filaments.

The upper wall portion (10) of the hollow body (forming simultaneously the upper wall portion of the third cavity (9)) is radiation-absorbing, which property may be conferred upon the wall portion by incorporating soot, i.e., carbon black, into the coating material. As a result, the incident solar radiation (11) is absorbed particularly well and the liquid (12) is heated in the third cavity (9) to such an extent that at least part thereof vaporizes or is evaporated and diffuses in steam form through the pores of the upper wall portion (8) of the second cavity (6), where the steam is converted into condensate (13) under the cooling action of the liquid (12) freshly entering into the first cavity (3), the condensate being subsequently withdrawn through the outlet pipe (14). Those parts of the liquid (12) that have not evaporated leave the third cavity (9) through the outlet pipe (15).

EXAMPLE 1

The process and the device according to the invention were used for the desalting of sea water, which is an advantageous application field therefore. There was used a hollow body of 1 m² upper surface area (19), which latter was part of a double fabric wherein the distance between the two fabrics was 4 mm. The upper surface (10) was coated by a mixture of PVC and soot.

The lower wall portion of this double fabric forming at the same time the upper wall portion (8) of the second cavity (6) was provided additionally with a microporous membrane consisting of polytetrafluoroethylene and having about $1.4 \times 10^9$ pores per $cm^2$ and a maximal pore size of 0.2 μm.

The first cavity was formed by a second double fabric made of polyester, provided with spacer filaments and being bilaterally coated with PVC.

The distance between the microporous membrane at the upper wall portion of the second cavity and the lower wall portion (5) of the second cavity was 20 mm.

A 3.5 weight % saline having an initial temperature of 10° C. was passed through the hollow body (1) at a rate of 10 l/h, whereupon 250 g of water per hour condensed in the second cavity (6). The condensates were withdrawn through the outlet pipe (14). The outlet temperature of the (enriched) saline was 50° C., the radiation intensity was 600 W/m².

EXAMPLE 2

A 10 weight % solution of ethanol in water was treated in the device as specified in Example 1. The surface area of the separating element, which was exposed to solar radiation, was 1 m². The initial temperature of the solution of 5° C. had risen to 45° C. at the outlet. 350 g of solution per hour diffused and condensed in the cavity (6). The ethanol content of the condensate was 27.2 weight %, and was thus distinctly higher than that of the initial solution.

What is claimed is:

1. In a device for separating mixtures of matter by the use of radiant solar energy, the matter being in the liquid phase, in the form of a flat, hollow body having an upper wall and a lower wall, and being constructed of a material that is liquid-tight; comprising a lower cavity having a lower wall constituted by the body lower wall and a liquid-tight upper wall; a middle cavity having as a lower wall thereof the upper wall of the lower cavity and an upper wall which is liquid-tight but vapor-permeable; an upper cavity having as a lower wall thereof the vapor-permeable upper wall of the middle cavity and as an upper wall thereof the body upper wall; a fluid inlet communicating with the lower cavity; a residue outlet communicating with the upper cavity; a product outlet communicating with the second cavity; and a bridging conduit bridging said middle cavity and communicating with said upper and lower cavities; the improvement wherein the upper wall of the upper cavity includes means for absorbing solar radiation; and said upper and lower walls of said upper and lower cavities are formed of fabric, with the upper and lower walls of each of said upper and lower cavities being joined by spacers in the form of filaments.

2. Device for separating liquid mixtures of matter according to claim 1; wherein the vapor-permeable lower wall of said upper cavity includes a membrane.

3. Device for separating liquid mixtures of matter according to either claim 1 or claim 2; wherein said means on said upper wall of said upper cavity for absorbing solar radiation includes a synthetic coating material colored black.

4. Device for separating liquid mixtures of matter according to claim 2; wherein said membrane includes polytetrafluoroethylene.

5. Device for separating liquid mixtures of matter according to claim 1; wherein said vapor-permeable lower wall of said upper cavity includes a microporous membrane.

* * * * *